United States Patent [19]

Lofdahl

[11] 4,179,319

[45] Dec. 18, 1979

[54] HEAT RECOVERABLE ARTICLE AND METHODS USING SAME

[75] Inventor: Clyde A. Lofdahl, Los Altos, Calif.

[73] Assignee: Raychem Corporation, Menlo Park, Calif.

[21] Appl. No.: 762,432

[22] Filed: Jan. 24, 1977

[51] Int. Cl.² .................... B32D 3/10; B29C 27/00
[52] U.S. Cl. ............................. 156/86; 156/78; 156/85; 174/77 R; 174/84 R; 174/151; 174/DIG. 8; 264/342 R; 428/131; 428/137; 428/322; 428/913
[58] Field of Search ............... 428/131, 188, 913, 137, 428/320, 322; 156/84–86, 78; 264/209, 210 R, 342 R; 285/381, DIG. 10; 174/DIG. 8, 65 R, 77 R, 84 R, 151

[56] References Cited

U.S. PATENT DOCUMENTS

| | | | |
|---|---|---|---|
| 2,739,829 | 3/1956 | Pedlow et al. | 156/86 |
| 3,086,242 | 4/1963 | Cook et al. | 264/209 |
| 3,276,929 | 10/1966 | Ferch | 156/86 |
| 3,382,121 | 5/1968 | Sherlock | 156/86 |
| 3,539,411 | 11/1970 | Heslop et al. | 156/84 |
| 3,669,824 | 6/1972 | Hess | 428/913 |
| 3,749,621 | 7/1973 | Shoffner | 156/86 |
| 3,758,353 | 9/1973 | Huriez | 156/86 |
| 3,910,448 | 10/1975 | Evans et al. | 174/DIG. 8 |
| 3,985,951 | 10/1976 | Harris | 156/86 |
| 3,990,661 | 11/1976 | De Groef | 285/381 |

Primary Examiner—George F. Lesmes
Assistant Examiner—P. Thibodeau
Attorney, Agent, or Firm—Lyon & Lyon

[57] ABSTRACT

A laminated sealing article comprising a layer of adhesive sandwiched between a pair of cross-linked, dimensionally heat unstable wafers of polymeric material. The article is provided with a plurality of apertures adapted to receive a corresponding plurality of substrates. The gaps between the plurality of substrates are sealed by heating the article to the recovery temperature of the wafers. This heating causes the layer of adhesive to bond to the substrates and the wafers to recover around the substrates thereby forming a seal between all of the substrates and the article. The heat recoverable article of the invention is particularly well adapted for use in a method of environmentally sealing the rear of an electrical connector of the type having a plurality of individually insulated electrical conductors extending from a tubular rear portion.

15 Claims, 10 Drawing Figures

U.S. Patent  Dec. 18, 1979  Sheet 1 of 2  4,179,319
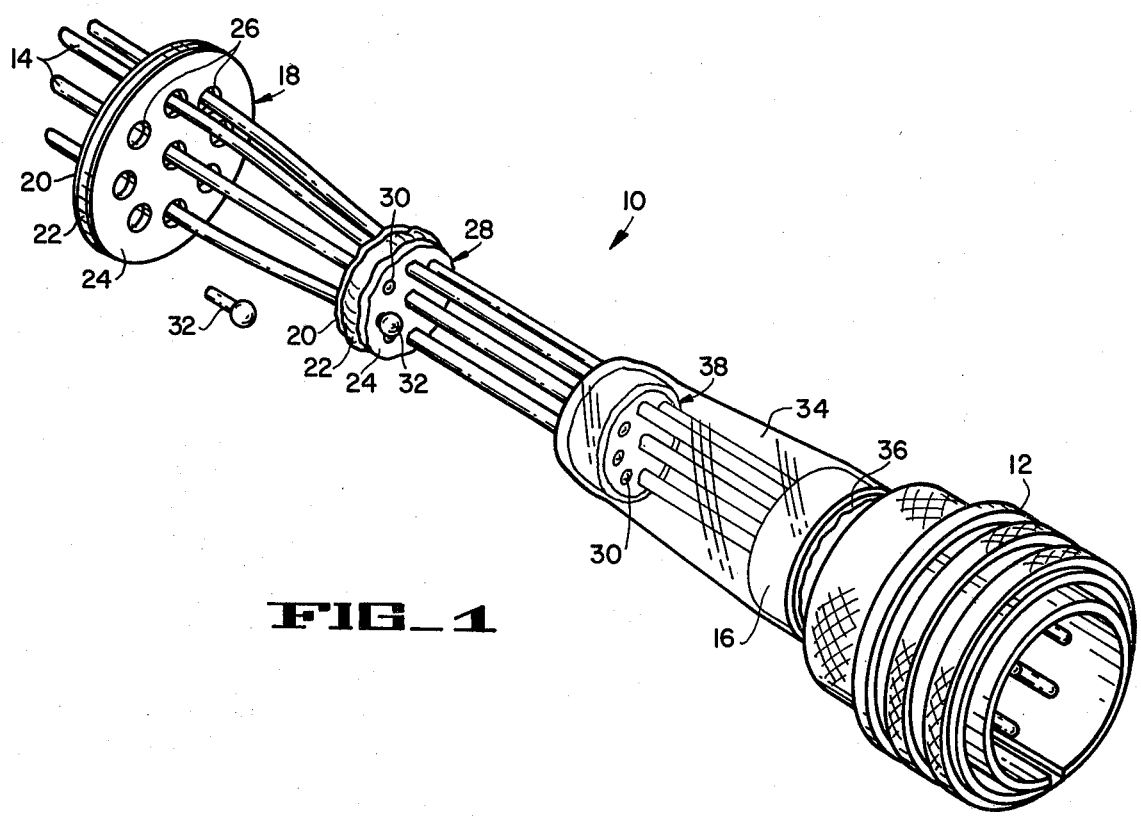
FIG_1
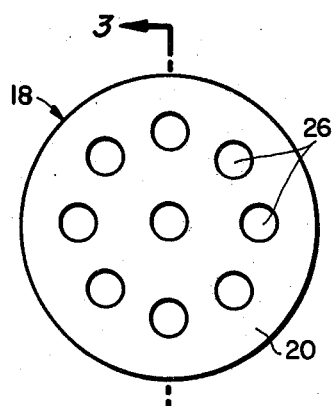
FIG_2
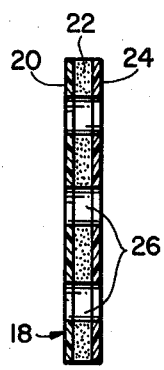
FIG_3
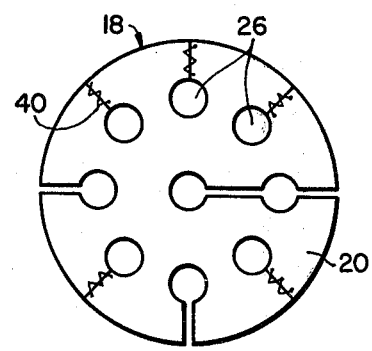
FIG_4
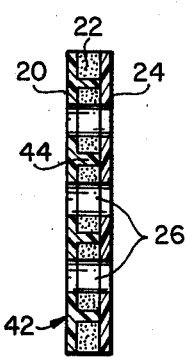
FIG_6
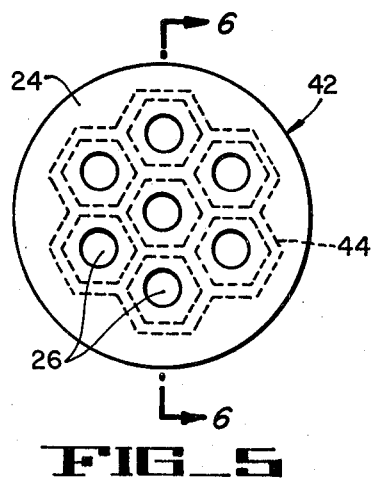
FIG_5

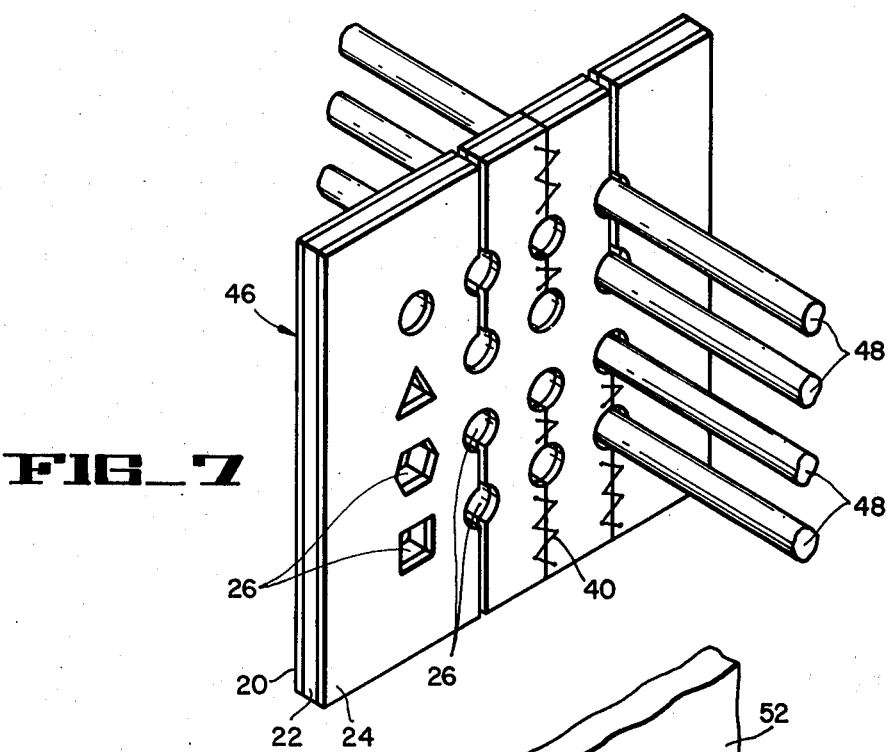
FIG_7
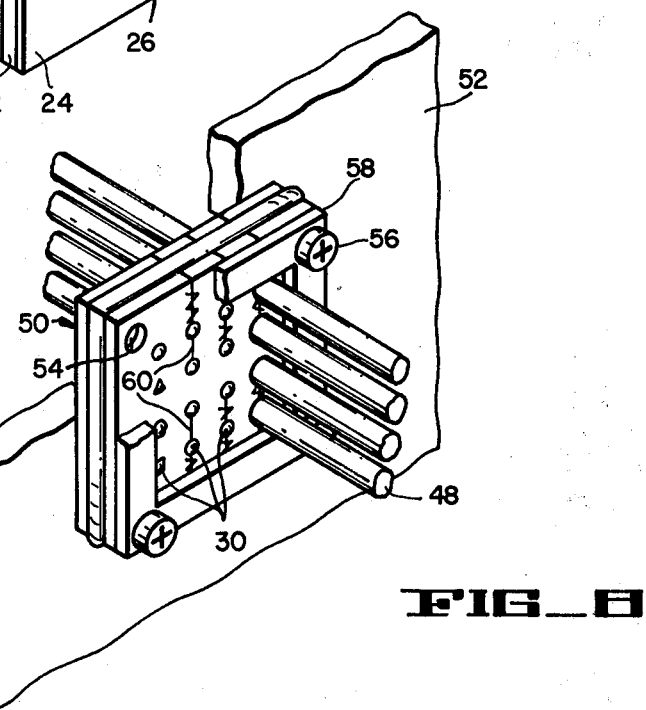
FIG_8
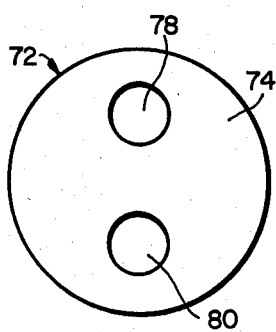
FIG_10
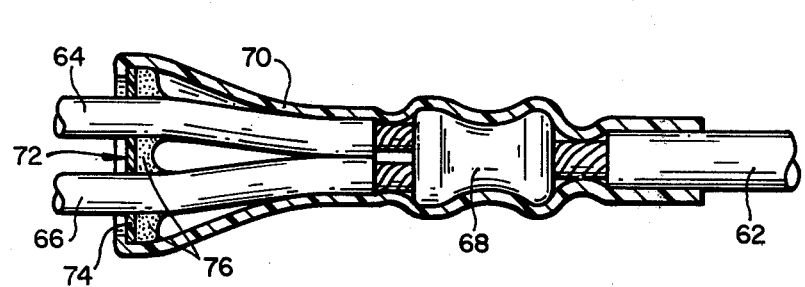
FIG_9

HEAT RECOVERABLE ARTICLE AND METHODS USING SAME

BACKGROUND OF THE INVENTION

I. Field of the Invention

This invention relates generally to heat recoverable articles used to form a seal between a substrate and a bounded opening through which the substrate extends and methods incorporating the use of such articles. More specifically, it relates to a laminated sealing article comprising at least one wafer of radially expanded, cross-linked, dimensionally heat unstable polymeric material and a layer of adhesive bonded thereto.

II. Description of the Prior Art

Forming an environmental seal between a single substrate and an opening through which the substrate passes is a frequently encountered problem to which many solutions are known. For example, if the gap between the opening and the substrate is small, the gap can be filled with a suitable caulking compound. Alternatively if the opening is provided with an outwardly extending flange, a section of heat shrinkable tubing can be recovered around both the flange and the substrate thereby forming the desired seal. The sealing problem becomes more difficult when the gap between the substrate and the opening is large and/or when two or more substrates extend through the same opening. Much difficulty is encountered with a plurality of substrates because all of the gaps between the substrates must be sealed.

One specific multiple substrate sealing problem occurs in aircraft wiring harnesses where a plurality of individually insulated electrical conductors enter the rear of a multiple contact connector. Because the individual conductors must be removable and replaceable, an epoxy resin or other functionally similar permanent potting compound cannot be used to seal the rear of the connector. Currently, many connector manufacturers employ a resilient multi-apertured sealing grommet of silicon rubber or the like to form a seal around each conductor as it enters the rear of the connector. The apertures in the sealing grommet which correspond to unused contacts in the connector are sealed with removeable plastic pins. In both principle and practice this sealing arrangement is quite satisfactory as long as all of the conductors extend straight back from the rear of the connector. However, because of dense equipment packaging requirements, it is not unusual to find installations where the individual conductors are disposed at right angles to the rear of the connector. In such installations where a conductor is pulled sideways, the corresponding aperture in the sealing grommet is distorted from a circular configuration to an oval one and the seal between the grommet and the conductor is broken. Water which can condense on the conductors frequently flows along the conductor's surface and into the connector causing electrical malfunctions which can ground the aircraft.

Analogous sealing problems occur in buildings where wires, cables, tubing, pipes, electrical conduits, heating and cooling ducts and the like pass through walls or partitions. Environmental seals are frequently required in such locations to provide protection against, for example, fire, moisture, dust, heat, cold, noise, pressure differentials, bacteria, insects, rodents and other pests, toxic chemicals, radioactive materials and the like. Although many techniques are known for sealing the gaps between such substrates and openings, all suffer from at least one disadvantage.

SUMMARY OF THE INVENTION

The present invention overcomes many of the disadvantages associated with prior art techniques used to form a seal between one or more substrates and an opening through which the substrates extend. It does so by providing a novel heat recoverable article which includes at least one wafer of cross-linked, dimensionally heat unstable polymeric material having a layer of adhesive bonded thereto. Preferably, the heat recoverable article of the invention includes a first wafer of cross-linked, dimensionally heat unstable polymeric material, a layer of adhesive bonded to the first wafer, and a second wafer of cross-linked dimensionally heat unstable polymeric material bonded to the adhesive layer thereby forming the heat recoverable article with the layer of adhesive disposed between the two wafers.

The heat recoverable article can be provided with one or more apertures which are adapted to receive corresponding substrates extending through the article, whereby heating the article to the recovery temperature of the wafers causes the layer of adhesive to bond to the substrates and the wafers to recover around the substrates thereby forming a seal between the substrates and the article. The heat recovered article with the bonded substrates in place can then be mounted diaphragm-like over a larger opening. Alternatively, the adhesive covered peripheral edge of the recovered article can be engaged by a heat shrinkable tubular product or the like which either forms the bounded opening to be sealed to or can itself be sealed in conventional ways to another opening.

The heat recoverable article of the invention is particularly well adapted for use in a method of environmentally sealing the rear of an electrical connector of the type having a plurality of individually insulated electrical conductors extending from a tubular rear portion.

BRIEF DESCRIPTION OF THE DRAWINGS

The many objects and advantages of the present invention will become apparent to those skilled in the art when the following description of the best mode contemplated for practicing the invention is read in conjunction with the accompanying drawings, wherein like reference characters refer to the same or similar elements, and in which:

FIG. 1 is a perspective view of a heat recoverable article of the invention shown in combination with a heat shrinkable sleeve to environmentally seal the rear of an electrical connector;

FIG. 2 is a front view of an unrecovered sealing disc as is shown in FIG. 1;

FIG. 3 is a side cross-sectional view of the heat recoverable sealing disc of FIG. 2 as viewed through the lines 3—3;

FIG. 4 is a front view of the heat recoverable sealing disc of FIG. 2 which has been selectively slit and partially sewn to illustrate how the invention can be installed on existing substrates without having access to the substrates' ends;

FIG. 5 is a front view of a heat recoverable sealing disc possessing molded means for restricting the flow of a portion of the layer of adhesive;

FIG. 6 is a side cross-sectional view of the heat recoverable sealing disc of FIG. 5 as viewed through the lines 6—6;

FIG. 7 is a perspective view of a selectively slit, partially sewn embodiment of the invention with four to-be-sealed substrates in place;

FIG. 8 is a perspective view with portions broken away of the subsequently heat recovered embodiment of the invention shown in FIG. 7 mounted diaphragm-like against a partition having an opening through which the four substrates extend;

FIG. 9 is a partial cross-sectional view of an environmentally sealed three wire splice incorporating a single wafer embodiment of the invention; and FIG. 10 is a front view of the single wafer embodiment of the invention shown in FIG. 9 prior to installation and heat recovery on two of the three wires.

DETAILED DESCRIPTION OF THE PREFERRED EMBODIMENT

Referring now generally to the several figures and specifically to FIG. 1, a portion of a wiring harness 10 is shown in perspective. The harness includes a multiple contact electrical connector 12 having a plurality of individually insulated electrical conductors 14 extending from a tubular rear portion 16. Three articles of the invention 18, 28 and 38 are shown positioned on a plurality of electrical conductors 14. Each of the articles shown in FIG. 1 is formed with a first wafer of cross-linked, dimensionally heat unstable polymeric material 20, a layer of adhesive 22 bonded to the first wafer 20 and a second wafer of cross-linked, dimensionally heat unstable polymeric material 24 also bonded to the layer of adhesive 22 so as to sandwich the adhesive between the two wafers as shown. The heat recoverable article 18 is provided with a plurality of apertures 26 each of which extends continuously through the first wafer 20, the layer of adhesive 22 and the second wafer 24. Each of the apertures 26 is adapted to receive an electrical conductor 14 as shown. Heating the article 18 causes the wafers 20 and 24 to shrink around the conductors 14 forming a heat recovered article 28. The layer of adhesive 22 which was bonded to the wafers 20 and 24 remains bonded to the wafers. Undoubtedly, many physical factors are responsible for the propensity of the wafers to remain relatively parallel to one another following the heat recovery process. Factors which are thought to contribute to this result are the wetting of the wafers by the adhesive, the surface tension of the adhesive and the high viscosity of the adhesive.

If the unused apertures 26 in the heat recoverable article 18 are sufficiently small, they will be completely closed by the flow of the layer of adhesive 22 during the heating process as is indicated in the drawings of the recovered articles 28 and 38 by the reference numeral 30. Alternatively, if the geometry of the apertures 26 is such that they will not be sealed by the flow of the layer of adhesive 22 or if it desired to insert an additional conductor 14 at some later time, then a sealing pin 32 can be employed as shown to fill the hole. Preferably, the sealing pin 32 is made from a material that the layer of adhesive 22 will not adhere strongly to, for example Teflon TM.

The heat recovered article 28 can be used in combination with heat-shrinkable tubular products to environmentally seal the rear of the electrical connector 12. Such a heat-shrinkable tubular product can be produced using the method of Cook et al., U.S. Pat. No. 3,086,242, the disclosure of which is incorporated herein by reference. To environmentally seal the rear of the connector 12, the individually insulated electrical conductors 14 are positioned through corresponding apertures in a heat recoverable article as described above. A heat-shrinkable tubular product is positioned over the tubular rear portion 16 of the connector 12 and over the periphery of the heat recoverable article or sealing disc. The sealing disc and heat-shrinkable tubular product are heated causing the layer of adhesive 22 to bond to the conductors 14 and to an interior surface portion of the heat-shrinkable tubular product forming the heat recovered article 38 as shown. The other end of the tubular product 34 is recovered around the tubular rear portion of the connector 16. A layer of adhesive 36 can be disposed as shown between the outer surface of the tubular rear portion 16 and an inner surface portion of the heat shrinkable tubular product 34 as shown to ensure the integrity of the seal. Of course, the sealing disc can be positioned and recovered separately followed by the positioning and heating of the tubular product. Moreover, although the heat shrinkable tubular product 34 is shown in FIG. 1 as a straight tubing section, it is to be understood that the product can be of other configurations, for example, a right angle sleeve. If so desired, a potting compound can be injected into the mold formed by connector 12, the heat recovered article 38, and the heat shrinkable tubular product 34 through a hole in the product (not shown).

The use of a potting compound is not required to maintain the integrity of the environmental seal. However, the frequent pressure differentials associated with aircraft operation and the slightly porous nature of many polymeric materials can result in the accumulation of small amounts of water at the rear of the connector 12. This problem may be avoided by placing a small packet of a hydroscopic compound such as, for example, crystals of anhydrous calcium sulfate (not shown) or a piece of treated hydroscopic paper (also not shown) inside the heat-shrinkable tubular product before the rear of the connector is sealed. The tubular product 34 can later be slit open and peeled from both the tubular rear portion 16 of the connector 12 and the periphery of the heat recovered article 38 thereby allowing selected conductors 14 to be removed from the connector 12. The heat recovered article 38 can either be completely removed and replaced by a new sealing disc or carefully heated to soften the adhesive layer 22 thereby allowing selected conductors 14 to be withdrawn from their corresponding apertures. Conversely, if an unused aperture is filled with a Teflon TM pin or the like the pin can be removed and an additional conductor 14 inserted through the aperture. Moreover, as will be discussed in greater detail below, the article 38 can be selectively slit and a conductor either removed or inserted and the slit subsequently healed by heating. After the rear of the connector 12 has been serviced, another heat-shrinkable tubular product can be positioned and heated as described above to reform an environmental seal.

The dimensionally heat unstable wafers of polymeric material perform at least two functions in this invention. The first function is to draw the adhesive down against the substrate and effect a seal. The second is to provide strain relief for flexible substrates such as electrical wires. The adhesive is generally too soft to provide this function alone. Repeated flexure of the wires (absent the wafers) would cause the adhesive to gradually disbond. In this invention the polymeric wafers on either side function to protect the adhesive from mechanical abuse which would tend to cause disbondment. In combination with a heat-shrinkable tubular product, such as is shown in FIG. 1, the strain relief function is carried one step further. The strain carrying path is from any individual wire to a polymeric wafer, to the adhesive inner layer, to the heat-shrinkable tubular product and finally to the electrical connector. As such, any strain placed on any wire or group of wires outboard of the sealed envelope is transferred to the connector through this strain carrying path and not to the individual wire-connector joints.

FIG. 2 is a front view of the heat recoverable article 18 shown in FIG. 1. In this embodiment, the first and second wafers 20 and 24 respectively comprise pieces of a cross-linked polymeric sheet material such as, for example polyethylene, which have been rendered dimensionally heat unstable. Cross-linked polymeric sheet materials which are dimensionally heat unstable along one axis are well known. Although such sheet material can be satisfactorily used in some embodiments of the present invention, the use of sheet material which is dimensionally heat unstable in more than one lateral direction is preferred. Throughout this application the phrase "multiaxially expanded" is intended to encompass any lateral stretching of a polymeric material which results in any dimensional heat instability along more than one axis in the plane in which the stretching was performed. Such a multiaxially expanded sheet of material can be prepared in a number of ways. For example, a square sheet of cross-linked polymeric material can be multiaxially expanded by heating the square above its crystalline melting temperature, pulling each edge of the square outwardly from the center of the square in the plane of the sheet and then allowing the stretched material to cool below its crystalline melting temperature. In the example just given, the sheet was stretched in a plane from four directions disposed at 90 degree increments around a central point. It is to be understood that the sheet could have been multiaxially expanded by stretching the sheet in a plane from three or more directions not necessarily uniformally disposed around a central point.

Another example of a method by which a sheet can be laterally expanded along more than one axis involves the use of a press having a pair of flat, parallel cooperating jaws. The desired result can be achieved by heating the cross-linked sheet above its crystalline melting temperature, squeezing it between the flat, parallel cooperating jaws of the press thereby causing it to spread laterally in all directions and allowing the sheet to cool below its crystalline melting temperature. A sheet of material which has been so processed is said to be radially expanded.

The thicknesses of the wafers 20 and 24 and the thickness of the layer of adhesive 22 can be varied for specific applications. However, if an external heat source such as an open flame or a hot air gun is used to install the article 18 and if the heat can be applied to only one wafer, then the layer of adhesive 22 must not be so thick that the other wafer cannot be heated to its recovery temperature through the adhesive.

In one presently preferred embodiment of the invention both wafers are cut from a sheet of cross-linked polyethylene about 0.060 inches thick which has been radially expanded thereby reducing the sheet's thickness to about 0.015 inches. This amount of radial expansion provides an approximately uniform lateral shrink ratio of 2 to 1. That is, if an expanded wafer is circular and has a diameter of 2 inches and a thickness of 0.015 inches, upon heating it will recover to a diameter of 1 inch and a thickness of 0.060 inches. The apertures in an article can be formed by removing a portion of each wafer and layer of adhesive with a punch, a drill or the like. Alternatively, a sharp object can be used to pierce the article and displace portions of the wafers and layer of adhesive around the pierced aperture.

FIG. 3 is a cross-sectional view of the heat-recoverable sealing disc 18 as viewed through the lines 3—3 in FIG. 2. This view clearly shows the apertures 26 which extend continuously through the first wafer 20, the layer of adhesive 22 and the second wafer 24. The layer of adhesive 22 can, depending on the application comprise for example, a hot melt adhesive such as, for example, 3M Jet Melt TM No. 3758 available from 3M Company, Minneapolis, Minn.; or a thermosetting adhesive such as, for example, Raychem adhesive No. S1009 available from Raychem Corporation, Menlo Park, Calif.; or a foaming adhesive such as, for example, 3M Jet Melt TM No. 3758 with a foaming agent such as, for example Celogen TM OT available from Uniroyal Chemical Corporation, Los Angeles, Calif.; or a mastic such as, for example, 3M Weatherban TM sealnat tape No. 1202.

The desired physical properties of the adhesive and the wafers will, of course, vary depending on specific applications. For example, the resistance of the article to flame can be improved by the use of a flame retardant such as, for example Dechloran+25 TM available from Hooker Chemical Company, Niagara Falls, N. Y. Such additives are preferably used in conjunction with suitable metal oxides such as aluminum or antimony oxides.

FIG. 4 is a front view of the heat-recoverable sealing disc 18 which has been selectively slit and partially sewn back together to illustrate how the invention can be installed on existing substrates without having access to the substrates' ends. For example, the sealing disc 18 shown in FIG. 4 can be installed on a plurality of electrical conductors 14 in the wiring harness 10 shown in FIG. 1. Although many types of thread 40 are suitable for sewing up the slits, a nonporous mono-filament thread is preferred. If so desired, the thread 40 can be formed with a cross-linked polymeric material such as for example, Kynar TM which has been rendered longitudinally heat shrinkable. The use of a heat shrinkable thread ensures that the slits will be drawn tightly together during the recovery process.

FIG. 5 is a front view of a heat recoverable sealing disc 42 possessing molded means 44 for restricting the flow of a portion of the layer of adhesive 22. The internal structure of the disc 42 is further illustrated in FIG. 6 which is a side cross-sectional view as seen through the lines 6—6 of FIG. 5. The sealing disc 42 includes the first wafer 20, the layer of adhesive 22 and the second wafer 24. However, the inside surface of the wafer 20 in contact with the layer of adhesive 22 is provided with a plurality of molded ribs 44 which form a honeycomb structure of nested hexagons. The molded ribs 44 function to restrict the flow of a portion of the layer of adhesive 22 during the heating of the article. Moreover, because of the laterally closed cellular structure of the ribs 44 shown in the embodiment of FIGS. 5 and 6, a portion of the adhesive layer 22 is positively driven into contact with those portions of a substrate extending through each aperture 26. Although the illustrated ribs 44 form a laterally closed cellular structure around each of the apertures 26 which structure possess additional functionally desirable attributes, it is to be understood that other rib configurations can be advantageously employed to restrict the flow of portions of the adhesive layer 22 and/or render the thus configured wafer stiffer.

A heat recoverable article 46 of the invention is shown in FIG. 7. The article 46 is formed with the layer of adhesive 22 sandwiched between the first and second wafers of cross-linked dimensionally heat unstable polymeric material 20 and 24 respectively. Four substrates 48 are shown disposed through four corresponding apertures 26. Heating the article to the recovery temperature of the wafers 20 and 24 shrinks the wafers around the substrates 48 and causes the layer of adhesive to bond to the substrates.

FIG. 8 is a perspective view (with portions broken away) of a heat recovered diaphragm 50 (formed by heating the heat recoverable article 46 shown in FIG. 7) mounted for sealing over an opening in a partition 52 through which the four substrates 48 extend. Mounting holes 54 have been made in the recovered diaphragm 50 which are adapted to receive corresponding fasteners 56 which extend through a sealing flange 58 and into the partition 52 as shown. This configuration of materials forms a seal between each of the individual substrates 48 and the partition 52. Additionally, the diaphragm functions to both relieve and distribute longitudinal stress in any of the substrates. The unused apertures 26 have been filled with adhesive as shown by reference numeral 30. All of the slits in the layer of adhesive 22 have been sealed during heating. Where slits in the wafers occur near the central portions of the wafers 20 and 24 they need not be sewn as shown at the slits 60.

FIG. 9 is a partial cross-sectional view of an environmentally sealed three wire splice incorporating a single wafer embodiment of the invention. A large insulated conductor 62 is connected to a pair of smaller conductors 64 and 66 with an electrically conductive metallic crimp splice 68. The splice connection is environmentally sealed with a section of heat shrinkable tubing 70 and a heat shrinkable article of the invention 72. The heat shrinkable article 72 is formed with a single wafer of cross-linked, dimensionally heat unstable polymeric material 74 bonded to a layer of adhesive 76 as shown.

The heat recoverable article 72 formed with a single wafer of heat recoverable material is in most applications inferior to an article formed with two wafers because the layer of adhesive is not confined on two sides. However, in selected applications, a heat recoverable article possessing a single wafer of cross-linked, dimensionally heat unstable polymeric material (such as the article 72) will function satisfactorily. When installing such an article, care must be exercised to ensure that the layer of adhesive 76 is properly disposed after heating. FIG. 10 is a front view of the heat recoverable article 72 shown prior to installation. The article possesses a pair of apertures 78 and 80 adapted to receive the conductors 64 and 66 respectively.

Portions of the heat recoverable article of the invention can be rendered electrically conductive thereby allowing the article to be heated and recovered by passing an electrical current through portions of the article.

The heat recovered article of the invention has utility when used to hold, separate and strain relieve a plurality of substrates such as, for example, when used as a cable tie in a wiring harness.

From the foregoing detailed description, it will be evident that there are a number of changes, adaptations and modifications of the present invention which come within the province of those skilled in the art; however, it is intended that all such variations not departing from the spirit of the invention be considered as within the scope thereof as limited solely by the appended claims.

I claim:

1. A heat recoverable article comprising at least two wafers of heat recoverable material, each of the wafers being a thin layer of a polymeric material which is heat-shrinkable in at least two directions in its plane such that each wafer recovers from its outer circumferential periphery towards its center, and at least one layer of adhesive positioned between and bonded to two of the wafers such that the wafers are at all times separated by the layer of adhesive, said article further comprising at least one aperture extending continuously through the wafers and the adhesive layer therebetween such that none of the adhesive is disposed within the apertures of the wafers before the recovery of the article, the apertures being adapted to receive a substrate extending through the article, whereby heating the article to the recovery temperature of the wafers causes each of the wafers to recover from its outer circumferential periphery towards its center such that the wafers draw the adhesive layer down against the substrate to form a bond with the portion of the substrate which lies between the wafers, and the wafers provide strain relief for the substrate.

2. The heat recoverable article of claim 1 wherein the recovery of the wafers causes a portion of the adhesive layer to be extruded from the outer circumferential periphery of the heat recoverable article such that the extruded adhesive forms a bond with an inner surface portion of an exterior surrounding heat-shrinkable sleeve.

3. The heat recoverable article of claim 1 wherein the layer of adhesive comprises a hot melt adhesive.

4. The heat recoverable article of claim 1 wherein the layer of adhesive comprises a thermosetting adhesive.

5. The heat recoverable article of claim 1 wherein the layer of adhesive comprises a foaming adhesive.

6. The heat recoverable article of claim 1 wherein the layer of adhesive comprises a mastic.

7. The heat recoverable article of claim 1 wherein the heat recoverable material is a radially expanded sheet.

8. The heat recoverable article of claim 1 wherein the directional orientations of dimensional heat instability associated respectively with a first and a second wafer having a layer of adhesive bonded therebetween, are similar.

9. The heat recoverable article of claim 8 wherein the first and second wafers are substantially identical.

10. The heat recoverable article of claim 1 wherein one of the first wafers is provided with molded means for restricting the flow of a portion of the layer of adhesive during the heating of the article to cause the wafers to recover.

11. The heat recoverable article of claim 10 wherein the molded means comprises a rib disposed around a portion of at least one aperture to form a laterally closed cell.

12. A heat recoverable article for sealing gaps between a plurality of substrates comprising a first and a second wafer of a heat-recoverable material, each of the wafers being a thin layer of a polymeric material which is heat-shrinkable in at least two directions in its plane such that each wafer recovers from its outer circumferential periphery towards its center, and a layer of adhesive positioned between and bonded to both of the wafers such that the wafers are at all times separated by the adhesive layer, the article having a plurality of apertures, each of which extends continuously through the first wafer, the layer of adhesive and the second wafer such that none of the adhesive is disposed within the apertures in the wafers before the recovery of the article, each aperture being adapted to receive a corresponding substrate extending through the article, whereby heating the article to the recovery temperature of the wafers causes each of the wafers to recover from its outer circumferential periphery towards its center such that each of the wafers recovers around each substrate, thereby drawing the adhesive layer down against each substrate to form a bond with the portion of each substrate which lies between the wafers, and provides strain relief for each substrate thereby forming a seal between each substrate and the article and sealing the gaps between the plurality of substrates.

13. The heat recoverable article of claim 12 wherein the layer of adhesive comprises a hot melt adhesive.

14. A method for forming a seal between a heat-recoverable article and an elongated substrate passing therethrough comprising the steps of:

positioning the elongated substrate through a corresponding aperture in the heat recoverable article which comprises a first and a second wafer of a heat recoverable material, each of the wafers being a thin layer of a polymeric material which is heat-shrinkable in at least two directions in its plane such that each wafer recovers from its outer circumferential periphery towards its center, and a layer of adhesive positioned between and bonded to both of the wafers such that the wafers are at all times separated by the layer of adhesive; and heating the heat recoverable article to the recovery temperature of the wafers causing each of the wafers to recover from its outer circumferential periphery towards its center such that each of the wafers recovers around the substrate thereby drawing the adhesive layer down against the substrate to form a bond with the portion of the substrate which lies between the wafers such that a seal is formed between the substrate and the article.

15. A method for environmentally sealing the rear of an electrical connector of the type having a plurality of individually insulated electrical conductors extending from a tubular rear portion comprising the steps of:

positioning the individually insulated electrical conductors through corresponding apertures extending continuously through the thickness of a heat recoverable sealing disc which comprises a first and a second wafer of a heat recoverable material, each of the wafers being a thin layer of a polymeric material which is heat-shrinkable in at least two directions in its plane such that each wafer recovers from its outer circumferential periphery towards its center, and a layer of adhesive positioned between and bonded to both of the wafers such that the wafers are at all times separated by the adhesive layer;

positioning a heat shrinkable sleeve over the tubular rear position of the electrical connector and the periphery of the heat recoverable sealing disc; and heating the heat recoverable sealing disc and the heat-shrinkable sleeve to their recovery temperatures causing each of the wafers to recover from its outer circumferential periphery towards its center such that each of the wafers recovers around the conductors thereby drawing the adhesive layer down against the conductors to form a bond with the portion of each conductor which lies between the wafers, and causing a portion of the adhesive layer to be extended from the outer circumferential periphery of the heat recoverable sealing disc such that the extruded adhesive forms a bond with an interior surface portion of the heat shrinkable sleeve, and said heat shrinkable sleeve to recover around said tubular rear portion of the electrical connector thereby environmentally sealing the rear of the electrical conductor.

* * * * *